(12) United States Patent
Urbanek (10) Patent No.: US 10,145,449 B2
(45) Date of Patent: Dec. 4, 2018

(54) METHOD FOR PRODUCING LOW-WASTE CHAIN LINK PLATES

(71) Applicant: iwis motorsysteme GmbH & Co. KG, Munich (DE)

(72) Inventor: Andreas Urbanek, Munich (DE)

(73) Assignee: IWIS MOTORSYSTEME GMBH & CO. KG, Munich (DE)

(*) Notice: Subject to any disclaimer, the term of this patent is extended or adjusted under 35 U.S.C. 154(b) by 0 days.

(21) Appl. No.: 15/887,846

(22) Filed: Feb. 2, 2018

(65) Prior Publication Data
US 2018/0231103 A1    Aug. 16, 2018

(30) Foreign Application Priority Data
Feb. 14, 2017   (DE) .......................... 10 2017 102 931

(51) Int. Cl.
*B21L 11/00* (2006.01)
*F16G 13/06* (2006.01)
(Continued)

(52) U.S. Cl.
CPC ............ *F16G 13/06* (2013.01); *B21D 28/06* (2013.01); *B21L 9/04* (2013.01); *B21L 11/00* (2013.01);
(Continued)

(58) Field of Classification Search
CPC .......... B21D 9/04; B21D 9/065; B21D 28/16; F16G 13/16; F16G 13/02; F16G 13/08;
(Continued)

(56) References Cited

U.S. PATENT DOCUMENTS 4,328,665 A    5/1982  Taubert et al.
4,362,078 A *  12/1982  Ohnishi ................. B21D 28/16
                                                               83/50
(Continued)

FOREIGN PATENT DOCUMENTS

DE           28 14 587 A1    10/1979
DE    10 2004 021 695 A1    1/2005
(Continued)

*Primary Examiner* — David B Jones
(74) *Attorney, Agent, or Firm* — Baker & Hostetler LLP (57) ABSTRACT

A method is provided for producing chain link plates for a plate link chain with alternating inner chain links and outer chain links, where the contour of the chain link plates has several punch sections and two face side and rear side contact sections which, after punching out the punch sections from the sheet metal strip provided, are first connected to complementary contact sections of adjoining chain link plates and separated in a subsequent separation cut. Further provided are bush or roller chains with outer chain link plates thus produced and a corresponding chain drive for an internal combustion engine with such a bush or roller chain. The method comprises the steps of: providing a sheet metal strip, punching out the punch sections of the chain link plates from the sheet metal strip, where a further rear side contact section, in addition to the face side contact sections, is respectively connected at the head portions of the chain link plates to a complementary contact section of adjoining chain link plates, and separating the face side contact sections and the rear side contact sections of the head portions of the chain link plates by way of a substantially waste-free separation cut.

9 Claims, 4 Drawing Sheets

(51) Int. Cl.
*F16G 13/16* (2006.01)
*B21L 9/04* (2006.01)
*B21D 28/06* (2006.01)
*F16G 13/02* (2006.01)
*F16G 13/08* (2006.01)
*F16G 15/14* (2006.01)

(52) U.S. Cl.
CPC ............. *F16G 13/02* (2013.01); *F16G 13/08* (2013.01); *F16G 13/16* (2013.01); *F16G 15/14* (2013.01); *Y10T 29/49794* (2015.01)

(58) Field of Classification Search
CPC . F16G 15/14; B21L 9/04; B21L 9/065; B21L 11/00
USPC ............................................................ 59/5
See application file for complete search history.

(56) References Cited

U.S. PATENT DOCUMENTS

| | | |
|---|---|---|
| 4,411,131 A | 10/1983 | Ohnishi et al. |
| 7,758,461 B2 | 7/2010 | Feld et al. |
| 9,003,758 B2 * | 4/2015 | Bodensteiner .......... B21L 9/065 59/13 |
| 2009/0111626 A1 | 4/2009 | Tohara et al. |

FOREIGN PATENT DOCUMENTS

| | | |
|---|---|---|
| DE | 20 2007 002 046 U1 | 7/2008 |
| DE | 10 2013 002 263 A1 | 8/2013 |
| EP | 0040120 A1 | 11/1981 |

\* cited by examiner

METHOD FOR PRODUCING LOW-WASTE CHAIN LINK PLATES

CROSS-REFERENCE TO RELATED APPLICATION

This application claims priority to foreign German patent application No. DE 10 2017 102 931.1, filed on Feb. 14, 2017, the disclosure of which is incorporated by reference in its entirety.

FIELD OF THE INVENTION

The present invention relates to a method for producing chain link plates for a plate link chain with alternating inner chain links and outer chain links, where the contour of the chain link plates has several punch sections and two face side and rear side contact sections which, after punching out the punch sections from the sheet metal strip provided, are first connected to complementary contact sections of adjoining chain link plates and separated only in a subsequent separation section. Furthermore, the invention relates to bush or roller chains with outer chain link plates produced said way and a corresponding chain drive for an internal combustion engine with such a bush or roller chain.

BACKGROUND

Chain link plates for conventional plate link chains, which are used in particular as drive chains in internal combustion engines, are typically produced in prior art in a two-stage punching process. The link openings and particularly loaded sections of the chain link plate contour, e.g. the plate back sides of simple chain link plates or the tooth flanks of toothed plates, are pre-punched from a sheet metal strip in a coarse manner with a series of different dies and then profiled in a second punching step. During profiling, the contour that is pre-cut with oversize in a coarse manner is punched to its final dimension in a profile cut, where the small machining width of the profile cut enables a smooth-cut portion which extends far beyond half of the cut surface of the punched-out contour. By profiling the link openings and other contours of the chain link plates subject to wear, the formation of microscopic cracks in the smooth-cut portion is prevented and the tear-free smooth-cut portion of the cut surface is significantly increased, thereby improving wear resistance and durability of the chain link plates.

Such a method for pre-punching and profiling chain link plates is described in DE 10 2004 021 695 A1. Only the portions of the link openings to be profiled and the contour of the toothed plates are there first punched out from a sheet metal strip, so that the plate that is pre-punched in a coarse manner is still firmly connected to the sheet metal strip in the curved face side regions. For improving positioning of the sheet metal strip and parallelism of the profiled surfaces, all sections of the chain link plate contour to be profiled are then punched out to their final dimensions in a second work step by profiling in the reverse order and punching direction. In a final step, the chain link plates are ultimately separated from the sheet metal strip at the curved face side regions by punching them out or blanking them.

The high performance chains used particularly in the field of automotive technology are exposed to high loads and dynamic load changes at high speeds and sometimes to an aggressive environment. Accordingly, it is important for such high performance chains that the functional surfaces in the region of the tooth flanks, plates, rear surfaces and pin openings exhibit low surface roughness, which can generally only be achieved by profiling or fine blanking. In automotive drives, such plate link chains typically run along guide and/or tensioning rails, for which reason, in particular, the plate back sides of the chain link plates must exhibit low surface roughness in order to obtain a suitable service life not only for the plate link chain but also for the associated rails.

Toothed chains are used in automotive drives in addition to simple non-toothed bush or roller chains, where the tooth contour of the toothed plates as a functional surface is also subjected to a profiling process or fine blanking. In addition to the tooth contour, also the plate back side is commonly fine punched or profiled in the case of such toothed plates, in order to obtain a desired surface quality. Such a profiled toothed plate is described, for example, in DE 20 2007 002 046 U1.

The production of toothed or non-toothed chain link plates for high-performance chains is typically effected from a steel sheet which is fed as a sheet metal strip to a punching machine. The chain link plates are punched out from this sheet metal strip in several punching steps, where the longitudinal axes of the chain link plates are typically aligned parallel to the longitudinal edge of the sheet metal strip and several punch tracks are commonly provided. A common punching method comprises e.g. eight punch tracks above one another. For example, an advance length of at least 17 mm is used with a straight chain link plate for a chain with a chain pitch of 8 mm and a plate length of 15.55 mm, where the distance between two consecutively arranged plates in such an embodiment is 1.45 mm and the distance between two punch tracks is approx. 2.25 mm. These distances are necessary in order to be able to form sufficiently stable dies that are inserted between the plate blanks and there punch away the waste material. In addition, a certain edge spacing from the edge of the sheet metal strip must be maintained so that considerable punching waste arises despite several punch tracks above one another.

A method for the production of high-performance chain link plates is known from DE 10 2013 002 263 A1 having a reduced punching waste. In this method, the feed length is reduced and preferably limited to a value just below twice the pitch. As a result, the face side head portions are connected after punching and are separated by a subsequent separation cut, so that the punch web otherwise typical in punching is eliminated. Since the surface roughness of the contour on the face side portions of the chain link plate is of minor importance, the separation edges and protruding burrs resulting from the separation by way of a separation cut are acceptable The same applies to the tips of the teeth of toothed plates which do not engage with the sprockets, regardless of the design and configuration of the toothed chain. In contrast, both the pin openings and the plate back sides, and also the front side sections of straight chain link plates as well as the outer flanks and inner flanks of toothed plates are provided with a high surface quality with the respective two-stage punching methods. The connection of the tooth tips of mutually facing tooth contours there serves a more accurate profiling process of the tooth flanks. Despite the reduced advance distance, the number of chain link plates producible from a sheet metal strip can be increased only slightly with this method.

SUMMARY OF THE INVENTION

It is therefore the object of the present invention to provide a method for producing chain link plates that, in addition to a significant reduction of punching waste, also increases the number of chain link plates punched out from one sheet metal strip.

This object is satisfied according to the invention in that the method for producing chain link plates for a plate link chain with mutually alternating inner chain links and outer chain links comprises the steps of: providing a sheet metal strip, punching out the punch sections of the chain link plates from the sheet metal strip, where during punching, a further rear side contact section, in addition to the face side contact sections, is respectively connected on the head portions of the chain link plates to a complementary contact section of adjoining chain link plates, and separating the face side contact sections and the rear side contact sections of the head portions of the chain link plates by way of a substantially waste-free separation cut. The chain link plates arranged on the edge of the sheet metal strip have the face side and the rear side contact sections respectively connected to a complementary contact section of the edge region, so that there as well punching out the punch sections and the subsequent separation cut can be effected complementarily to the inner chain link plates. The additional rear side contact sections enable more accurate punching of the punch sections at an increased punching speed. In addition, the spacing of the punch tracks relative to each other is reduced by the rear side contact sections, resulting in a reduction of punching waste.

In order to simplify the production of the chain link plates and to minimize the spacing between two punch tracks, when and after punching out the punch sections at the head portions of the chain link plates, a respective further front side contact section can be connected to a complementary contact section of adjoining chain link plates which are separated in the subsequent separation section together with the face side contact sections and the rear side contact sections. After the punch sections have been punched out, the rear side contact sections can advantageously be connected to the front side contact sections of adjoining chain link plates. As a result, all chain link plates produced from one sheet metal strip have the same rolling direction and correspondingly material properties associated therewith.

Punching out the punch sections of the chain link plates can preferably be done by pre-punching and subsequently profiling the punch sections. Profiling the pre-punched punch sections enables a substantially smooth surface in the cutting region of the plate contour with a wide smooth-cut portion without significant cracks or tear areas. In contrast to direct fine blanking of chain link plates, pre-punching and subsequent profiling enables the punch sections to be punched out comparatively fast with a comparable smooth-cut region.

An advantageous embodiment provides that the punch sections of the chain link plates have an at least concave transition region adjoining the face side, the rear side and/or the front side contact sections. The concave transition region to the face side, rear side and/or front side contact sections, which are later produced by the waste-free separation cut, serves to minimize or avoid the notch effect of the transition that can arise with the waste-free separation and the generally poorer quality of the cut surface of the contact sections. The substantially concave shape of the transition region to the punch sections prevents or reduces negative influence of the contact sections on the strength and durability of the chain link plates, because the concave shape forms a low-tension transition between the contact sections and the remaining punched-out contour of the chain link plates. In a useful embodiment, the invention relates to a method for producing weight and waste-optimized outer plates for a plate link chain, while taking into account the above-described variants. Each outer chain link there comprises at least two outer plates and each inner chain link at least one inner plate, where the contour of the outer plates comprises several punch sections and two face side contact sections which, once the punch sections are punched out, are initially connected to the face side contact sections of adjoining outer plates and separated in a subsequent separation cut. This embodiment of the method according to the invention is characterized by the following steps: providing a sheet metal strip, punching out the punch sections of several outer plates from the sheet metal strip, where a further rear side contact section, in addition to the face side contact sections, is respectively connected on the head portions of the outer plates to a complementary contact section of adjoining outer plates, and separating the face side contact sections and the rear side contact sections of the head portions of the outer plates by way of a substantially waste-free separation cut. In conventional outer plates for plate link chains, in particular for plate link chains which are used as high-performance chains in internal combustion engines and exposed to extreme static and dynamic loads and an aggressive environment, sufficient material is required between the plate back sides of the outer plates and adjoining regions of the sheet metal strip in order to be able to punch in a clean manner and to ensure a sufficient quality of the cut surface. The method according to the invention makes it possible to position the outer plates on the sheet metal strip close to one another not only in the longitudinal direction of the plates but also in their transverse direction, so that the punching waste can be significantly reduced in comparison to conventional plates.

A punch section that is set back in the direction of the plate longitudinal axis exists between the two rear side contact sections at the head portions of the outer plates produced according to the invention, due to which the length of the rear side contact sections is kept short, so that a substantially waste-free separation cut can be performed at all without bending or distorting the outer plate. Preferably, the rear side contact sections are arranged such that the outer plate has a symmetrical contour relative to the transverse axis. For the greatest possible reduction of punching waste and the most effective utilization of the sheet metal strip, the rear side contact sections can be connected to corresponding front side contact sections of adjoining outer plates or to corresponding contours at the edge of the sheet metal strip, respectively. This enables a reduction of the sheet metal strip up to 30% over conventional outer plates or a correspondingly increased output of outer plates made of a sheet metal strip. In addition, a symmetrical geometry then arises in the direction of the longitudinal axis of the outer plates.

One advantageous embodiment provides that the face side and/or the rear side contact sections of the head portions of the outer plate are set back relative to the contour of the at least one inner plate in the direction of the pin openings or plate longitudinal axis, respectively. Also optional front side contact sections respectively provided are set back relative to the contour of the at least one inner plate in the direction of the pin opening. In contrast to conventional outer plates, the outer plates produced according to the method to the invention not only have no straight and end-to-end plate back side, but the plate back side is according to the head portions presently provided and the punch section arranged therebetween subdivided into three sections which are set back relative to the contour of the inner plates in order to cause no wear-increasing effect due to the rough cut surface and possibly protruding burrs on the rear side contact sections. Accordingly, possible wear of the plate link chain is prevented and in particular of the components of the drive that are in contact with the plate link chain. Since the contour of the at least one inner plate protrudes relative to the contact sections and, in particular, relative to the rear side contact sections, contact only arises between the inner plates and the associated tensioning and guide rails, also in the case of a plate link chain that is preloaded in an internal combustion engine. This can prevent both increased wear and premature failure of the associated chain drive. For effective use of the manufactured outer plates, in particular also for high-performance chain drives in internal combustion engines, the plate link chain can be a drive chain configured as a bush or roller chain.

The present invention further relates to a bush or roller chain with alternating inner chain links and outer chain links which are each connected to one another by way of a chain joint, where each outer chain link comprises at least two outer plates each with two face side head portions and two pin openings disposed in the head portions, and two chain pins extending through the pin openings and connecting the outer plates, each inner chain link comprises at least one inner plate and two pin openings spaced from each other, and where one chain pin of an outer chain link extends through a pin opening of an adjoining inner chain link for forming the chain joint. The contour of the outer plates comprises several punch sections produced by way of punching, and on each of the two head portions, at least one face side and one rear side contact section which are produced by way of a separation cut subsequent to the punch sections being punched out, where the face side and/or rear side contact sections are set back relative to the contour of the inner plates in the direction of the pin openings. Such a bush or roller chain can be produced with less material usage and exhibits an approximately equal wear and aging behavior, despite the simpler and less expensive production. Also possible components of an associated drive are not subject to any additional load due to the unchanged contour of the plate back sides of the inner plates, since the plate back sides of the inner plates in view of the set-back contour of the outer plate bear in a supporting manner against respective components.

A particular embodiment provides that the contour of the outer plates on the two face side head portions each further comprise at least one front side contact section which are produced by way of a separation cut subsequent to the punch sections being punched out and are set back relative to the contour of the inner plates in the direction of the pin openings. These optional front side contact sections again reduce the punching waste arising during the production of the outer plates, thereby increasing the yield of outer plates from a given sheet metal strip. The length of the rear side contact sections, and also the optionally provided front side contact sections can be minimized if, according to one embodiment, the contour of the outer plates between the two face side contact sections is waisted and set back relative to the contour of the inner plates.

In addition, the invention relates to a chain drive for a an internal combustion engine, in particular a timing chain drive, with a driving sprocket, at least one driven sprocket, and a bush or roller chain described above. Costs for the internal combustion engine can be reduced with such a chain drive, since such a bush or roller chain is much cheaper to produce as compared to conventional chains. Moreover, in the accelerated manufacturing process of the chain link plates of such a high-performance chain, far less material needs to be used. Since the requirements for bush or roller chains for internal combustion engines have been steadily increasing in recent years or decades, more higher quality materials and heat treatment processes are also being used. A reduction in material in the manufacturing process is therefore of great advantage and leads to significant cost reduction.

BRIEF DESCRIPTION OF THE DRAWINGS

The invention is further illustrated in more detail using the drawings, where.

DETAILED DESCRIPTION

An embodiment of a bush or roller chain according to the invention is explained in more detail below with reference to FIGS. 1 to 4.

Figure 1:
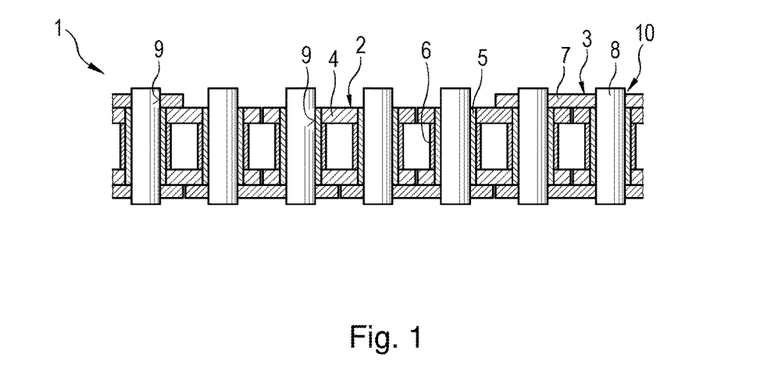
FIG. 1 shows a sectional view of an embodiment of a bush or roller chain according to the invention.
Figure 2:
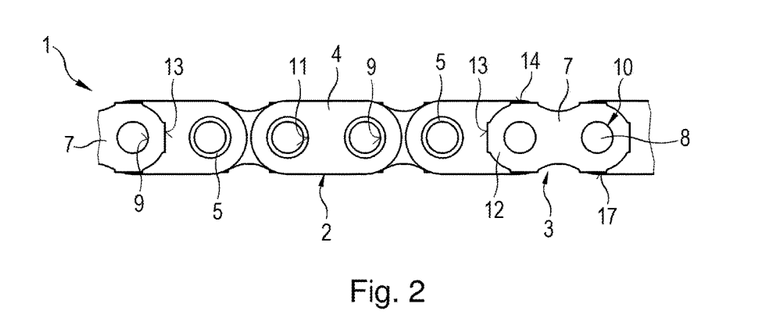
FIG. 2 shows the bush or roller chain from FIG. 1 in a side view.

Drive chain 1 shown in FIG. 1 and FIG. 2 is configured as a roller chain, where an outer plate 7 has been omitted for reasons of clarity on one side on each of the two inner outer chain links 3. Drive chain 1 comprises alternating inner chain links 2 and outer chain links 3 which are each connected to one another via a chain joint 10. Each inner chain link 2 comprises two inner plates 4 spaced from one another and two bushings 5 connecting these inner plates to one another and two rotatably mounted rollers 6 which are each arranged on a bushing 5. Bushings 5 are pressed into corresponding bushing openings 11 of inner plates 4 and slightly project laterally. In one embodiment of drive chain 1 as a bush chain, the configuration is identical to alternating inner chain links 2 and outer chain links 3, but no rollers 6 are provided on bushings 5 of inner chain links 2.

Outer chain links 3 comprise two outer plates 7 spaced from one another and two chain pins 8 spaced from one another in parallel that connect them. Chain pins 8 are pressed into corresponding pin openings 9 of outer plates 7 and slightly project laterally. A chain pin 8 respectively extends through each bushing 5. Chain pin 8 of outer chain link 3 together with associated bushing 5 of inner chain link 2 form a chain joint 10. Bushings 5 of inner chain links 2 slightly protruding relative to inner plates 4 hold outer plates 7 at a small distance from inner plates 4, so that, with a motion of drive chain 1 about chain joint 10, friction resistance arises only between the face side of bushing 5 and outer plates 7.

Figure 3:
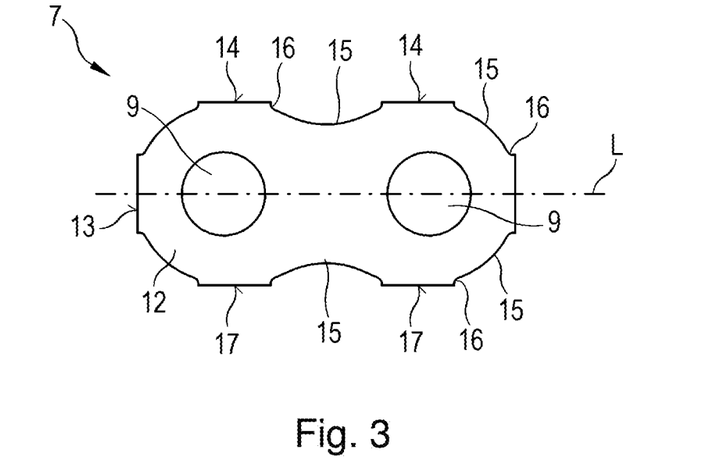
FIG. 3 shows an enlarged side view of an outer plate of the bush or roller chain from FIG. 1.

FIG. 3 shows an enlarged side view of an outer plate 7 of drive chain 1 from FIGS. 1 and 2. Outer plate 7 is formed to be waisted and forms two head portions 12 at the face sides, in the center of which pin openings 9 are arranged. The two head portions at the face side ends each comprise a face side contact section 13, with which outer plate 7 is connected to adjoining outer plates during production after the process step of punching out the punch sections. Head portions 12 are each further provided with a rear side contact section 14 along the plate back side of outer plate 7, where a finely punched or profiled punch section 15 is positioned between the two rear side contact sections 14. Punch section 15 is set back relative to the two rear side contact sections 14 in the direction of plate longitudinal axis L. A concave transition region 16 is there provided at the ends of punch section 15 adjoining rear side contact section 14. Concave transition region 16 not only improves the force distribution within outer plates 7 and thereby increases the strength of outer plates 7, but is preferably also provided with a good surface roughness in order to minimize the notch effects arising in the transition between punch section 15 and rear side contact section 14.

Outer plate 7 in FIG. 3 also on the front side of outer plate 7 facing away from the plate back side comprises two front side contact sections 17 which are associated with respective head portions 12 and which are likewise spaced from a punch section 15 that is set back in the direction of plate longitudinal axis L. Punch sections 15 provided between rear side contact sections 13 and front side contact sections 17 respectively form a contour of outer plate 7 that is waisted in the direction of plate longitudinal axis L. In addition to these centrally arranged punch sections 15, two punch sections 15 are respectively also provided on head portions 12 and separate rear side contact sections 14 or front side contact sections 17, respectively, from face side contact sections 13. Also these punch sections 15 are at the ends each provided with a concave transition region 16 to improve the force distribution in outer plate 7 and to minimize the notch effect.

Figure 4:
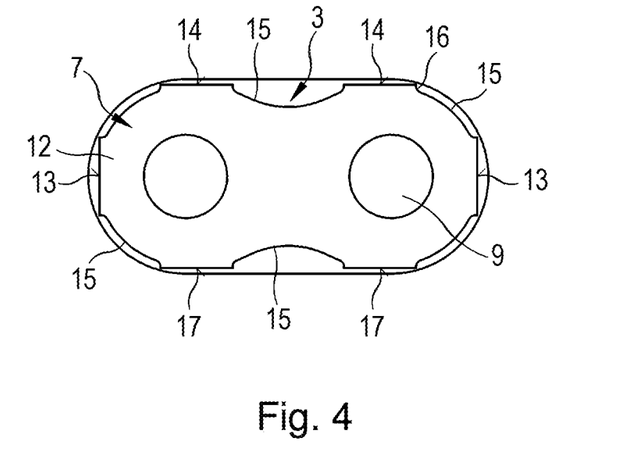
FIG. 4 shows a side view of the outer plate from FIG. 3 over an inner plate of the bush or roller chain from FIG. 1.

The enlarged side view of outer plate 7 in FIG. 4 shows the contour of outer plate 7 with respect to the contour of inner plates 4 used in drive chain 1. It can be clearly seen in this illustration that the contour of outer plate 7 is set back relative to the contour of inner plate 4 not only in the region of punch sections 15, but in particular also in the region of face side contact sections 13, rear side contact sections 14, and the front side contact sections 17. Accordingly, the rough cut surfaces and protruding burrs develop no additional wear on associated tensioning or guide rails 24, 26, especially at the rear side contact sections 14 when using drive chain 1 in a chain drive 21, because drive chain 1 is supported by the contour of inner plates 4 when sliding along tensioning or guide rails 24, 26. In particular the burrs possibly created in a separation cut could otherwise lead to rapid damage of the slide coating of tensioning or guide rails 24, 26, which would result in premature failure of chain drive 21.

Figure 5:
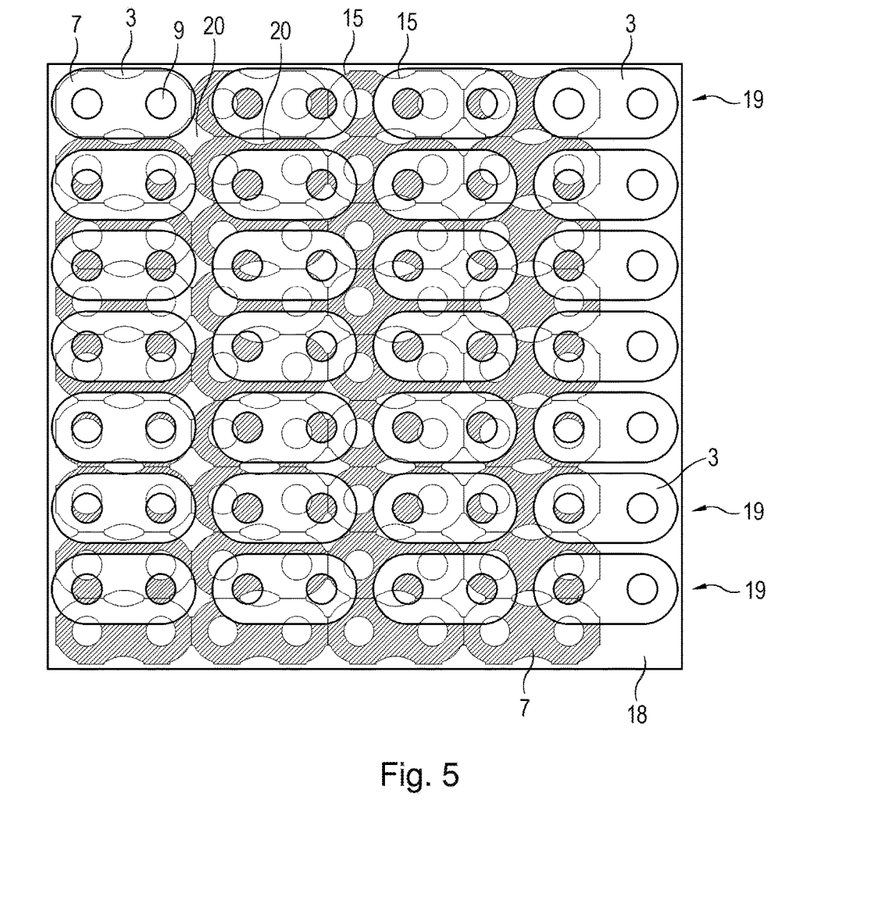
FIG. 5 shows a reduced view of a sheet metal strip with nine punch rows of the outer plate from FIG. 3 and seven punch rows of conventional chain link plates, respectively.

FIG. 5 shows a slightly reduced view of a sheet metal strip 18 with new [sic] punch rows of outer plates 7 of FIG. 3 and respectively seven punch rows of conventional chain link plates, for example, outer plates 7 with the contour of inner plates 4. Outer plates 7 are produced from steel sheet in link plate thickness. This sheet steel is supplied as sheet metal strip 18 to the punching device, where sheet metal strip 18 can be moved by a roll with a clocked stepwise advance through the punching machine or supplied to the punching machine as sheet metal strip 18 in the form of metal plates. FIG. 5 illustrates nine parallel juxtaposed punch rows 19, each with four waisted outer plates 7. Alternatively, seven parallel juxtaposed punch rows 19 with conventional chain link plates according to the contour of inner plates 4 can also be produced from these metal strips 18. In addition to the smaller number of punch rows 19, also a larger required sheet length results with a sufficient punching distance between the face sides of these conventional chain link plates for the respectively illustrated four conventional chain link plates per punch row 19. In the production of outer plates 7, punchouts 20 and pin openings 9 associated with punch sections 15 of respective outer plates 7 are first are pre-punched from sheet metal strip 18, where outer plates 7 have substantially already obtained their basic shape. Face side contact sections 13, rear side contact sections 14, and front side contact sections 17 are not separated from each other and not from the edge of sheet metal strip 18, respectively. Sheet metal strip 18 therefore has a field of 36 plate blanks not separate from each other. Pre-punching of punchouts 20 takes place with a low proportion of smooth cut and a rough surface quality. This applies, firstly, to punch sections 15 exposed by the pre-punching as well as to pre-punched pin openings 9.

In a subsequent method step, both pin openings 9 and punch sections 15 of outer plates 7 are profiled. Since a relatively small amount of material is removed during profiling, a surface with a relatively high proportion of smooth cut and a low surface roughness arises. Concave transition regions 16 provided with a radius are then also produced at the ends of punch sections 15. In a further method step, the link plate blanks connected to one another at face side contact sections 13 or at rear side contact and front side contact sections 14, 17, respectively, are separated from one another by way of a substantially waste-free separation cut. The separation cut is performed centrally between two adjacent pin openings of adjoining link plate blanks, so that a cut surface is formed extending perpendicular to plate longitudinal axis L. A further separation cut is also performed between individual punch rows 19, where rear side contact sections 14 are separated from the adjoining contact sections, presently front side contact sections 17 or the contact sections of the frame of sheet metal strip 18. The waste-free separation cuts are performed with a surface quality that is significantly lower than the surface quality of profiled punch sections 15, where the proportion of smooth cut is typically only at 20 to 30%, and an overall coarser fracture pattern and burrs at the cut surface arise.

Figure 6:
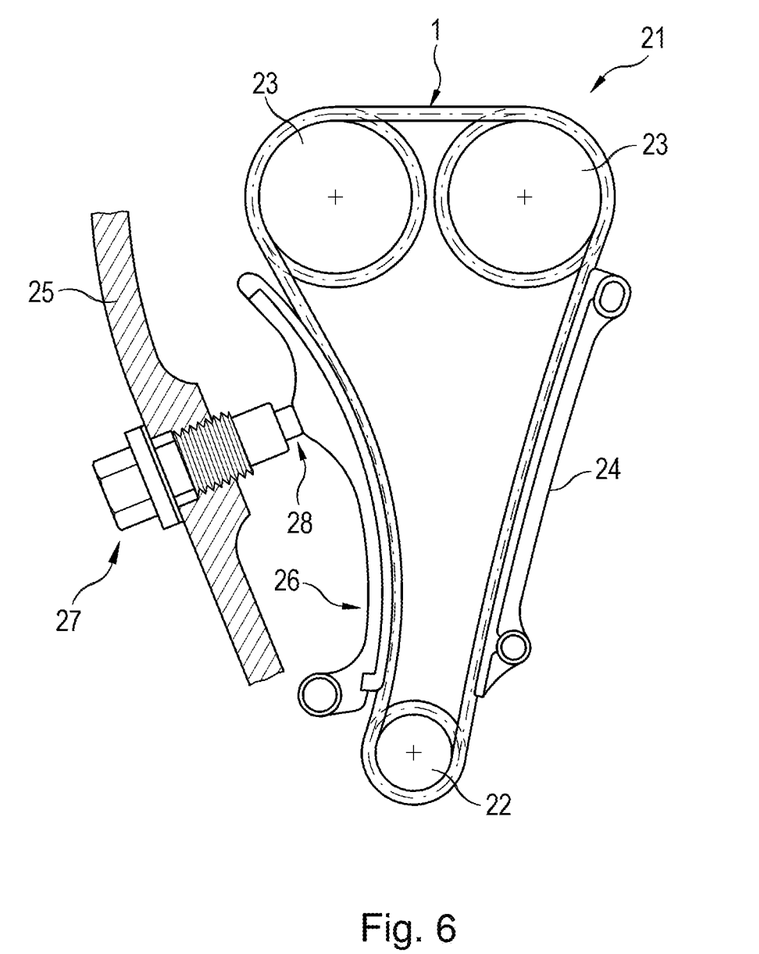
FIG. 6 shows a schematic representation of a chain drive.

Outer plates 7, produced according to the punching method illustrated with reference to FIG. 5, are used in drive chain 1 shown in FIGS. 1 and 2 which in turn can be used in a chain drive 21 shown by way of example in FIG. 6. Chin drive 21 shown in FIG. 6 is a timing chain drive of an internal combustion engine which connects crankshaft sprocket 22 to two camshaft sprockets 23. For this purpose, drive chain 1, configured as a roller or bush chain, is guided around sprockets 22,23. The drive span of chain drive 21 there bears against a guide rail 24, whereas the return span is guided by a tensioning rail 26 that is pivotally mounted on the engine block and that is pressed onto drive chain 1 by a chain tensioner 27. Chain tensioner 27 is presently, as a screw-in tensioner, screwed into a section of engine block 25 and presses onto a rear region of tensioning rail 26 by use of a tensioning piston 28. Drive chain 1 must there be configured such that it can slide along the slide surfaces of guide rail 24 and tensioning rail 26. For this purpose, the contour of inner plates 4 projects relative to rear side contact sections 14 of outer plates 7 such that only the plate back sides of inner plates 4 support when drive chain 1 slides along the sliding surfaces and the respective high surface quality of the plate back sides of inner plates 4 create no additional wear on the slide surfaces of guide rail 24 and tensioning rail 26.

LIST OF REFERENCE NUMERALS 1 drive chain
2 inner chain links 3 outer chain links
4 inner plate
5 bushing
6 rollers
7 outer plates
8 chain pins
9 pin openings
10 chain joint
11 bushing openings
12 head portion
13 face side contact section
14 rear side contact section
15 punch section
16 concave transitional region
17 front side contact section
18 sheet metal strip
19 punch row
20 punchouts
21 chain drive
22 crankshaft sprocket
23 camshaft sprocket
24 guide rail
25 engine block
26 tensioning rail
27 chain tensioner
28 tensioning piston
L plate longitudinal axis

The invention claimed is:

1. A method for producing chain link plates for a plate link chain with alternating inner chain links and outer chain links, where each outer chain link comprises at least two chain link plates each having two face side head portions and two pin openings disposed in said head portions and two chain pins extending through said pin openings and connecting said chain link plates to one another, each inner chain link comprising at least one chain link plate and two mutually spaced pin openings and one respective chain pin of an outer chain link extends through a pin opening of an adjoining inner chain link to form a chain joint, the contour of said chain link plates being defined by a plurality of punch sections and two face side contact sections formed on the two face side head portions which, once said punch sections are punched out, are initially connected to said face side contact sections of adjoining chain link plates and separated in a subsequent separation cut,
comprising the steps of:
providing a sheet metal strip,
punching out material of said sheet metal strip to form said punch sections of said chain link plates, where a further rear side contact section, in addition to said face side contact sections, is respectively connected at said head portions of said chain link plates to an adjacent front side, rear side or face side contact section of adjoining chain link plates, and
separating said face side contact sections and said rear side contact sections of said head portions of said chain link plates by way of a substantially waste-free separation cut.

2. The method according to claim 1, wherein, after punching out said punch sections at said head portions of said chain link plates, a respective further front side contact section is connected to an adjacent front side, rear side or face side contact section of adjoining chain link plates which are separated from one another in said subsequent separation cut.

3. The method according to claim 2, wherein, after punching out said punch sections, said rear side contact sections are connected to said front side contact sections of adjoining chain link plates.

4. The method according to claim 1, wherein punching out said punch sections of said chain link plates is done by pre-punching and subsequently profiling said punch sections.

5. The method according to claim 1, wherein said punch sections of said chain link plates have an at least concave transition region adjoining said face side, said rear side and/or said front side contact sections.

6. A method for producing weight and waste-optimized outer plates for a plate link chain where each outer chain link comprises at least two outer plates each having two face side head portions and two pin openings disposed in said head portions and two chain pins extending through said pin openings and connecting said chain link plates to one another, and each inner chain link at least one inner plate and two mutually spaced pin openings and one respective chain pin of an outer chain link extends through a pin opening of an adjoining inner chain link to form a chain joint, the contour of said outer plates being defined by a plurality of punch sections and two face side contact sections formed on the two face side head portions which, once said punch sections are punched out, are initially connected to said face side contact sections of adjoining outer plates and separated in a subsequent separation cut, comprising the steps of:
providing a sheet metal strip,
punching out material of said sheet metal strip to form said punch sections of several outer link plates, where a further rear side contact section, in addition to said face side contact sections, is respectively connected at said head portions of said outer plates to an adjacent front side, rear side or face side contact section of adjoining outer plates, and
separating said face side contact sections and said rear side contact sections of said head portions of said outer plates by way of a substantially waste-free separation cut.

7. The method according to claim 6, wherein said rear side contact sections of said head portions of said outer plates are set back relative to the contour of said at least one inner plate in the direction of said pin openings.

8. The method according to claim 6, further comprising providing said plate link chain as a drive chain configured as a bush or roller chain.

9. The method according to claim 6, wherein said face side contact sections of said head portions of said outer plates are set back relative to the contour of said at least one inner plate in the direction of said pin openings.

* * * * *